(12) United States Patent
Chou

(10) Patent No.: US 9,367,312 B2
(45) Date of Patent: Jun. 14, 2016

(54) PROCESSOR EFFICIENCY BY COMBINING WORKING AND ARCHITECTURAL REGISTER FILES

(71) Applicant: Oracle International Corporation, Redwood City, CA (US)

(72) Inventor: Yuan C. Chou, Los Gatos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 310 days.

(21) Appl. No.: 14/190,296

(22) Filed: Feb. 26, 2014

(65) Prior Publication Data

US 2015/0242209 A1 Aug. 27, 2015

(51) Int. Cl.
*G06F 9/38* (2006.01)
*G06F 9/30* (2006.01)
*G06F 9/00* (2006.01)

(52) U.S. Cl.
CPC ........ *G06F 9/30043* (2013.01); *G06F 9/30127* (2013.01); *G06F 9/384* (2013.01); *G06F 9/3863* (2013.01)

(58) Field of Classification Search
None
See application file for complete search history.

(56) References Cited

U.S. PATENT DOCUMENTS

2013/0086365 A1* 4/2013 Gschwind ........... G06F 9/30072
712/220

* cited by examiner

*Primary Examiner* — Scott Sun
(74) *Attorney, Agent, or Firm* — Park, Vaughan, Fleming & Dowler LLP

(57) ABSTRACT

A processor includes an execution pipeline configured to execute instructions for threads, wherein the architectural state of a thread includes a set of register windows for the thread. The processor also includes a physical register file (PRF) containing both speculative and architectural versions of registers for each thread. When an instruction that writes to a destination register enters a rename stage, the rename stage allocates an entry for the destination register in the PRF. When an instruction that has written to a speculative version of a destination register enters a commit stage, the commit stage converts the speculative version into an architectural version. It also deallocates an entry for a previous version of the destination register from the PRF. When a register-window-restore instruction that deallocates a register window enters the commit stage, the commit stage deallocates local and output registers for the deallocated register window from the PRF.

20 Claims, 3 Drawing Sheets

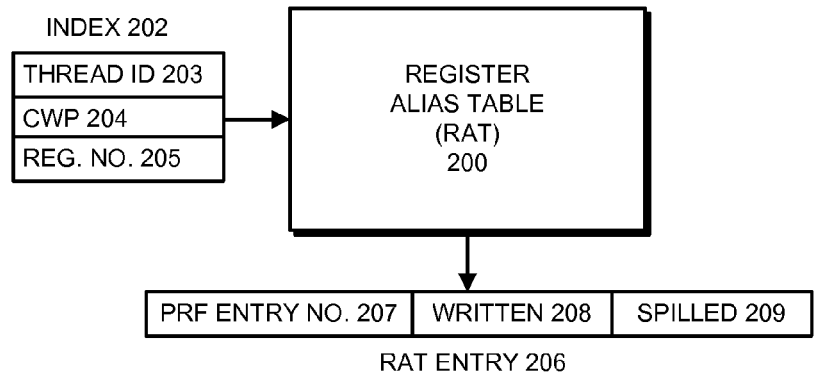
FIG. 2
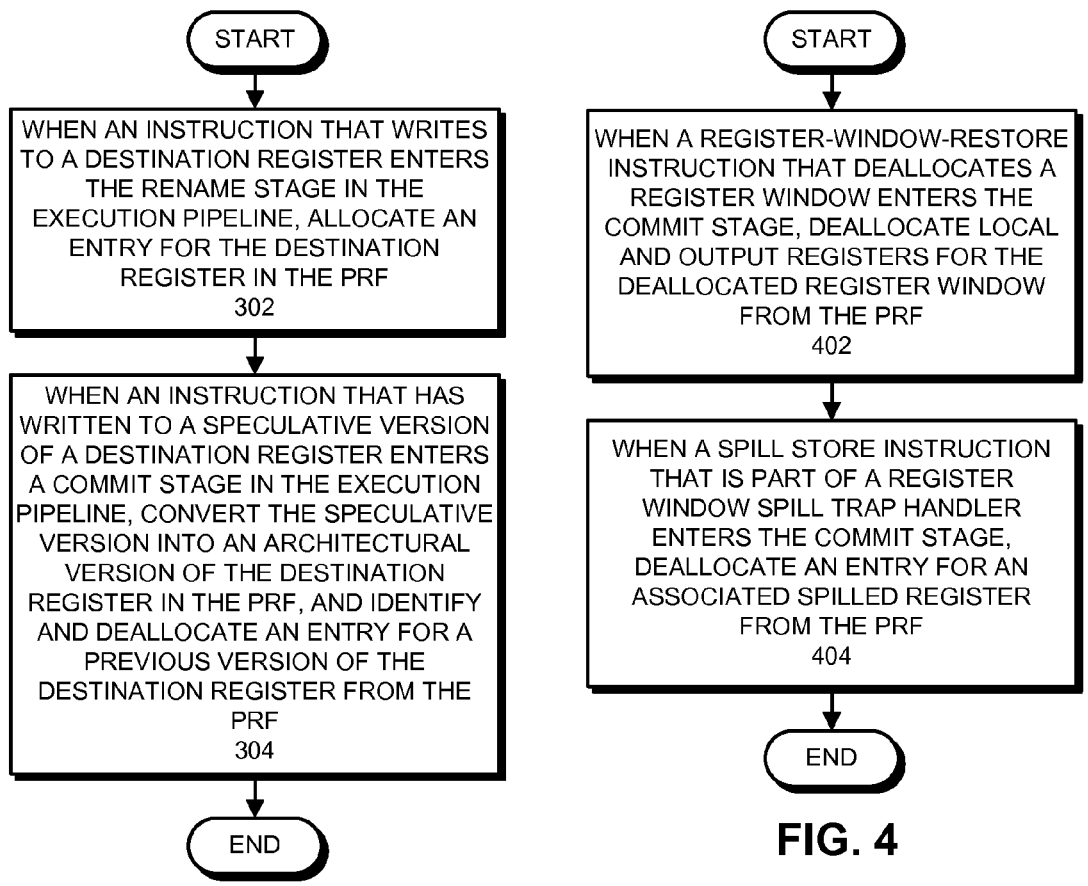

PROCESSOR EFFICIENCY BY COMBINING WORKING AND ARCHITECTURAL REGISTER FILES

BACKGROUND

1. Field

The disclosed embodiments generally relate to techniques for improving performance in computer system processors. More specifically, the disclosed embodiments relate to the design of a processor, which reduces power consumption and improves die-area efficiency by combining a working register file and an architectural register into a single physical register file.

2. Related Art

In modern processor architectures, such as the SPARC™ processor architecture, the complete register state of a processor is often stored in a Working Register File (WRF) and an Architectural Register File (ARF). More specifically, the speculative register state of the processor is stored in the WRF, while its non-speculative register state is stored in the ARF. Instructions can read their source operands from either the WRF or the ARF, depending on which contains the latest version of the data. Instructions write destination operands to the WRF when they complete execution, and when the instructions ultimately commit, their result data is copied from the WRF to the ARF.

However, this WRF/ARF processor organization is not power-efficient because data needs to be copied between the WRF and the ARF, and this additional copying operation consumes power. It is also not area-efficient because, at any given time, many entries in the ARF are either unused or are storing data that will not be used by the processor. These entries correspond to the architectural registers that either have not been defined or are no longer live. Hence, the area used by such registers is essentially wasted.

Moreover, the WRF and ARF consume significant amounts of power and occupy a significant amount of semiconductor area because they contain many entries and provide multiple read and write ports. (In fact, the ARF for a recently developed SPARC™ processor contains approximately 1300 entries.)

Hence, it is desirable to be able to store the speculative and non-speculative register state for a processor without the above-described drawbacks of a WRF/ARF processor organization.

SUMMARY

The disclosed embodiments relate to the design of a processor that efficiently stores both speculative and non-speculative register state. This processor includes an execution pipeline configured to execute instructions for threads, wherein for each thread, an architectural state of the processor includes a set of register windows associated with nested procedure calls for the thread, wherein each register window contains registers for an associated procedure call. The processor also includes a physical register file (PRF) containing both speculative and architectural versions of registers, wherein the speculative versions of the registers have been modified but have not yet been committed to the architectural state of the processor.

During operation of the processor, when an instruction that writes to a destination register enters a rename stage in the execution pipeline, the rename stage allocates an entry for the destination register in the PRF. Moreover, when an instruction that has written to a speculative version of a destination register enters a commit stage in the execution pipeline, the commit stage converts the speculative version into an architectural version of the destination register in the PRF, and also deallocates an entry for a previous version of the destination register from the PRF. Finally, when a register-window-restore instruction that deallocates a register window enters the commit stage, the commit stage deallocates local and output registers for the deallocated register window from the PRF.

In some embodiments, when a spill-store instruction that is part of a register window spill trap handler enters the commit stage, the commit stage deallocates an entry for an associated spilled register from the PRF.

In some embodiments, the processor includes a register alias table (RAT) that maps an architectural register to a PRF entry that holds a latest value for the register, wherein the RAT includes an entry for each architectural register. Moreover, the RAT comprises both a speculative version of the RAT maintained at the rename stage, and a non-speculative version of the RAT maintained at the commit stage.

In some embodiments, when a branch misprediction occurs, the processor copies the non-speculative version of the RAT to the speculative version of the RAT.

In some embodiments, the processor includes a written bit mask, which is a per-thread bit mask that includes a bit for each architectural register that indicates whether the architectural register has been written by an instruction.

In some embodiments, when a register-window-save instruction that allocates a register window enters the commit stage and a number of available PRF entries is below a threshold value, the system preemptively spills up to N registers starting with an oldest register window and stopping before a second youngest window, wherein spilling a register includes copying the register to a backing store and deallocating the register from the PRF. In some embodiments, the processor is configured to perform preemptive spill operations by spilling one register per cycle whenever an unused PRF read port is available.

In some embodiments, when an instruction enters the rename stage and a source operand for the instruction was in a register that was preemptively spilled, the processor performs a fill operation by allocating a PRF entry for the register and copying a value for the register from the backing store into the entry.

In some embodiments, the processor includes a spilled bit mask, which is a per-thread bit mask that includes a bit for each architectural register that indicates whether the architectural register has been preemptively spilled to the backing store.

In some embodiments, the backing store includes an entry for each architectural register and is indexed by an architectural register number. In some embodiments, the backing store includes one read port and one write port, or a shared read/write port.

BRIEF DESCRIPTION OF THE FIGURES

FIG. 2 illustrates the structure of a register alias table (RAT) in accordance with disclosed embodiments.

FIG. 3 presents a flow chart illustrating how registers are generally allocated and deallocated from the physical register file (PRF) in accordance with the disclosed embodiments.

FIG. 4 presents a flow chart illustrating how certain register-windowing operations cause deallocations of associated registers for the PRF in accordance with the disclosed embodiments.

DETAILED DESCRIPTION

Figure 1:
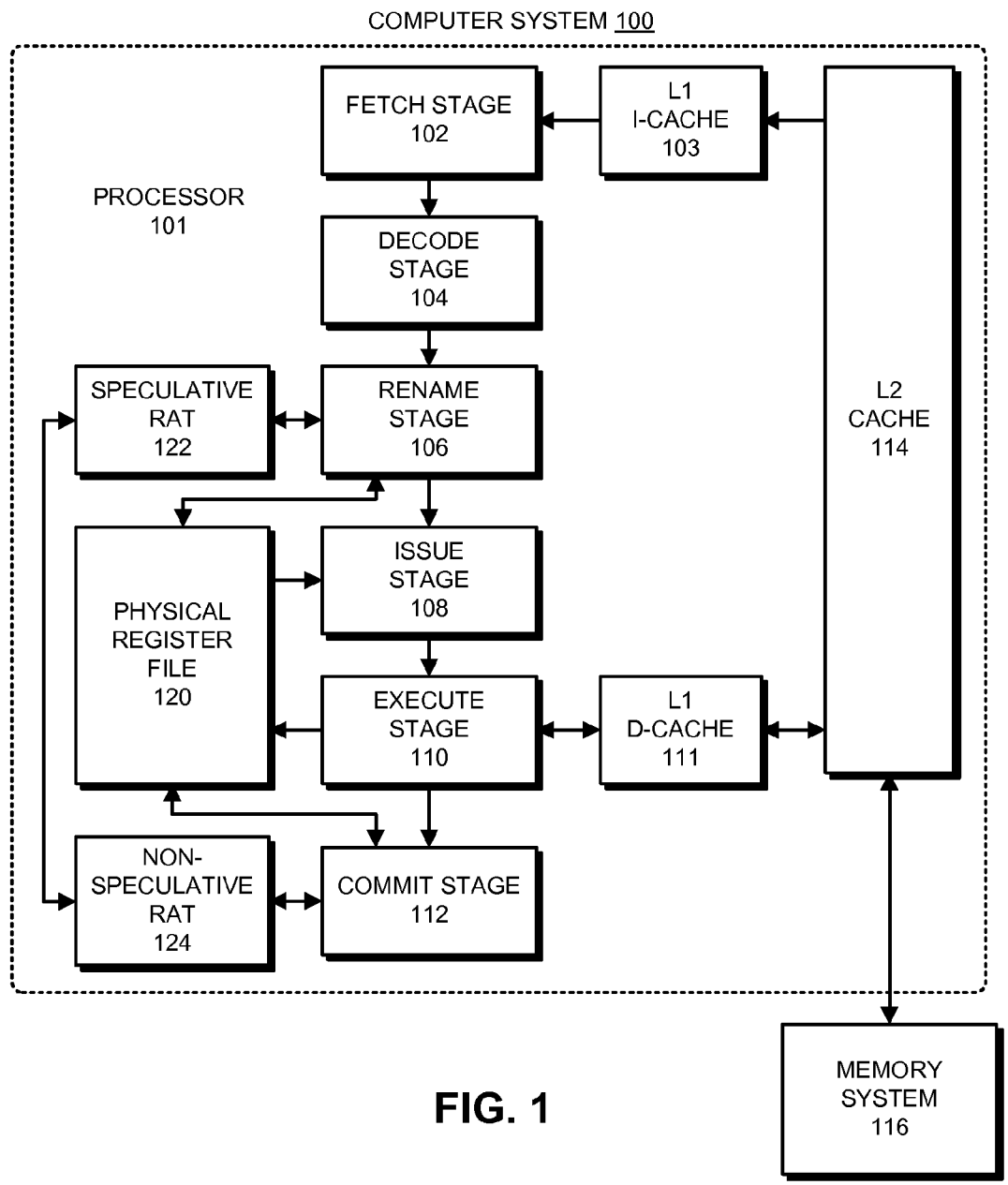
FIG. 1 illustrates a processor in accordance with disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments improve processor power consumption and die-area efficiency by combining the WRF and the ARF structures into a single structure called the Physical Register File (PRF). Power consumption is improved because data does not need to be copied between the WRF and the ARF. Area efficiency is improved because the PRF is much smaller than the combined sizes of the WRF and ARF.

The PRF is located in the processor and holds the committed as well as speculative state of every architectural register for every thread in that processor. Note that the PRF subsumes the WRF and ARF used in the current processors. The PRF is read when an instruction is issued and written when an instruction completes execution. The number of read and write ports provided by the PRF depends on the number of instructions that can be concurrently issued each cycle.

To facilitate accessing the PRF the system includes a register alias table (RAT), which maps an architectural register to the PRF entry that is assigned to hold its latest value. Note that the RAT has as many entries as the number of architectural registers. In the disclosed embodiments, the system accesses two separate copies of the RAT, a speculative copy maintained at the rename pipeline stage, and a non-speculative copy maintained at the commit pipeline stage. When the processor pipeline is flushed after a branch misprediction, the contents of the non-speculative copy are copied over to the speculative copy.

The system also maintains a written bit mask, which is a per-strand bit mask, with as many bits as the number of architectural registers. Each bit indicates whether the corresponding architectural register has been written by an instruction. (Note that this written bit mask can possibly be incorporated into the RAT as is illustrated in FIG. 2.)

A PRF entry can be allocated as follows. When an instruction that writes a destination register reaches the processor's rename pipeline stage, the destination register number is converted to an architectural register number using the value of the current window pointer (CWP). A PRF entry is then allocated for this architectural register. The speculative copy of the RAT is also updated with this new mapping, and the written bit mask is updated to indicate that this architectural register is being written.

A PRF entry can be deallocated as follows. When an instruction that writes a destination register (including a register-window-restore instruction) reaches the commit stage, if the bit in the written bit mask for the destination register is set, the previous PRF entry assigned to the destination register, as indicated by the non-speculative copy of the RAT, is deallocated. Note that this PRF entry contains the previous value for the destination register, which can now be deallocated since there will be no more reads of this old value. If the bit in the written bit mask corresponding to the destination register is not set, the system sets it. In either case, the non-speculative copy of the RAT is updated with the new mapping.

When a spill-store instruction (which is part of the register window spill trap handler) reaches the commit stage, the PRF entry corresponding to the spilled register is deallocated. In addition, the bit in the write bit mask corresponding to the spilled register is cleared.

When a register-window-restore instruction is committed, the PRF entries corresponding to the "local" and "output" registers of the old register window are deallocated, and the bits in the written bit mask corresponding to these registers are cleared.

Also, whenever an instruction that writes a destination register is flushed from the processor pipeline, the PRF entry that was allocated for its destination register is deallocated.

The disclosed embodiments also support a "preemptive spill operation." The idea behind this operation is to proactively deallocate physical registers that have been assigned to architectural registers which are unlikely to be accessed soon. The values of these deallocated registers are spilled to a backing store. If and when these values are eventually needed, they are restored from the backing store and copied to the PRF. Note that the backing store can either be the regular cache hierarchy (similar to how regular register window spills/fills are performed, i.e. to/from the program stack in memory) or a dedicated hardware structure.

To support the preemptive spill operation, the system provides a "spilled bit mask," which is a per-strand bit mask, with as many bits as the number of architectural registers. Each bit indicates whether the corresponding architectural register has been spilled from the PRF to the backing store.

The backing store that is used for preemptive spills can be a dedicated hardware structure that holds the values of architectural registers which have been preemptively spilled. In one exemplary implementation, the dedicated backing store has as many entries as the number of architectural registers and is indexed using the architectural register number. Since preemptive spills and subsequent fills are infrequent, only one read port and one write port are needed. It may even be feasible to share a single read/write port.

A preemptive spill operation can be performed as follows. When a register-window save instruction is committed, if the number of available PRF entries is below a specified threshold, up to N registers are spilled to the backing store. Specifically, the PRF entries corresponding to these N architectural registers are deallocated and their values copied to the backing store. These N registers can be selected using the following technique. Starting with the oldest window and stopping before the second youngest window, the spilled bit mask is searched for the first zero bit. Beginning with this architectural register, up to N architectural registers are spilled, provided the register's corresponding bit in the spilled bit mask is zero and it does not belong to the current window or the second youngest window. When an architectural register is spilled, its corresponding bit in the spilled bit mask is set to one. In some embodiments, the spilling is performed by a decoupled engine that receives a list of registers to be spilled and then spills one register per cycle whenever there is an unused PRF read port that cycle.

A register that has been preemptively spilled may subsequently need to be filled. More specifically, when an instruction enters the rename stage and one of its source operands was an architectural register that was spilled (as indicated by a one in the corresponding bit in the spilled bit mask), the architectural register is filled by allocating a PRF entry and copying its value from the backing store to the PRF entry. In some embodiments, this fill is accomplished by injecting a fill helper instruction into the renamed instruction stream just ahead of that instruction. This fill helper instruction reads the backing store and copies the value into its allocated PRF entry. It also clears the corresponding bit in the spilled bit mask.

Before describing additional details of the processor and the PRF, we first describe the structure of a computer system that contains the processor.

Computer System

FIG. 1 illustrates a computer system 100 in accordance with the described embodiments. Computer system 100 can include any type of general-purpose or special-purpose computer system, including, but not limited to, a server, a desktop computer, a digital signal processor, a laptop computer, a notebook computer, a tablet computer, a personal digital assistant, a cell phone, a device controller, or a computational engine within an appliance. Computer system 100 includes a processor 101 and a memory system 116. Note that memory system 116 can include a main memory and possibly an L3 cache and an L4 cache.

Processor 101 includes an execution pipeline comprising a fetch stage 102, a decode stage 104, a rename stage 106, an issue stage 108, an execute stage 110 and a commit stage 112. During program execution, fetch stage 102 retrieves an instruction from level-one (L1) instruction cache (I-cache) 103. This instruction feeds through decode stage 104, which decodes the instruction, and then through rename stage 106, which performs register-renaming operations to identify the relevant operands for the instruction. Next, the decoded instruction feeds into issue stage 108, which selects an instruction with valid source operands to be executed. The selected instruction feeds into execute stage 110, which executes the instruction, wherein the execution can involve accessing data stored in L1 data cache (D-cache) 111 and accessing data stored in physical register file 120. In some embodiments, execute stage 110 comprises multiple functional units, which can include an integer unit, a floating-point unit, a branch unit and a load/store unit.

Physical register file (PRF) 120 includes entries for storing both speculative register values (which have been modified and are not yet committed) and non-speculative register values. Processor 101 also includes a speculative register alias table (RAT) 122 located near rename stage 106, which includes an entry for each architectural register and maps each architectural register to a PRF entry that holds the latest speculative or non-speculative value for the register. Processor 101 also includes a non-speculative RAT 124 located near commit stage 112, which maps each architectural register to a PRF entry that holds the latest non-speculative value for the register. The interactions among rename stage 106, speculative RAT 122, commit stage 112, non-speculative RAT 124 and PRF 120 during execution of various types of instructions are described in more detail below.

At the end of the execution pipeline, the instruction feeds into commit stage 112, which commits results produced during execution of the instruction.

Note that L1 I-cache 103 and L1 D-cache 111 both access a unified L2 cache 114, which stores both instruction cache lines and data cache lines. L2 cache 114, in turn, communicates with memory system 116.

Register Alias Table

FIG. 2 illustrates the structure of a register alias table (RAT) 200 in accordance with disclosed embodiments. RAT 200 can be either speculative RAT 122 or non-speculative RAT 124, which are both illustrated in FIG. 1. RAT 200 is a lookup structure that receives an index 202 that identifies an architectural register, wherein index 202 comprises a thread identifier 203, a current window pointer (CWP) 204 and a register number 205. RAT 200 uses index 202 to look up a RAT entry 206, wherein RAT entry 206 includes a PRF entry number 207 that specifies a location in PRF 120 for the latest version of the register. RAT entry 206 also includes a written bit 208 indicating whether an associated register has been written by an instruction, and a spilled bit 209 indicating whether an associated register has been preemptively spilled to the backing store.

Allocating and Deallocating PRF Registers

FIG. 3 presents a flow chart illustrating how registers are generally allocated and deallocated from the physical register file (PRF) in accordance with the disclosed embodiments. During operation of the processor, when an instruction that writes to a destination register enters the rename stage in the execution pipeline, the rename stage allocates an entry for the destination register in the PRF (step 302). Then, when an instruction that has written to a speculative version of a destination register enters the commit stage in the execution pipeline, the commit stage converts the speculative version into an architectural version of the destination register in the PRF, and also identifies and deallocates an entry for a previous version of the destination register from the PRF (step 304). Note that this previous version of the destination register can be determined by performing a lookup in the non-speculative RAT 124. After this lookup is performed, the entry for the destination register in the non-speculative RAT 124 is updated to point to the architectural version of the destination register in the PRF.

Deallocating PRF Entries During Register-Windowing Operations

FIG. 4 presents a flow chart illustrating how certain register-windowing operations cause deallocations of associated registers for the PRF in accordance with the disclosed embodiments. When a register-window-restore instruction that deallocates a register window enters the commit stage, the commit stage deallocates local and output registers for the deallocated register window from the PRF (step 402). Also, when a spill-store instruction that is part of a register window spill trap handler enters the commit stage, the commit stage deallocates an entry for an associated spilled register from the PRF (step 404).

Preemptive Spill

Figure 5:
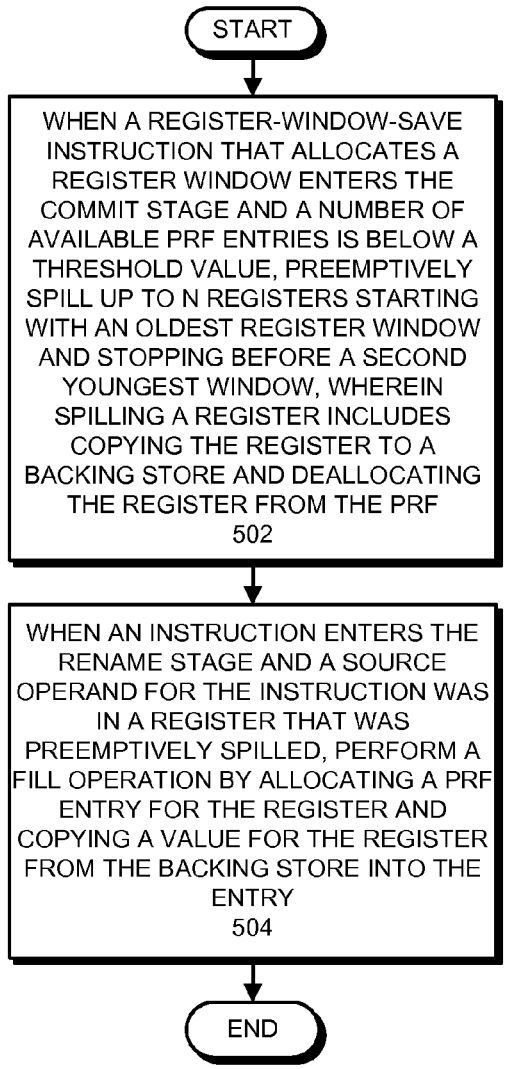
FIG. 5 presents a flow chart illustrating a preemptive spill operation and an associated fill operation in accordance with the disclosed embodiments.

FIG. 5 presents a flow chart for a preemptive spill operation and an associated fill operation in accordance with the disclosed embodiments. When a register-window-save instruction that allocates a register window enters the commit stage and a number of available PRF entries is below a threshold value, the commit stage preemptively spills up to N registers starting with an oldest register window and stopping before a second youngest window, wherein spilling a register includes copying the register to a backing store and deallocating the register from the PRF (step 502). Also, when an instruction enters the rename stage and a source operand for the instruction was in a register that was preemptively spilled, the processor performs a fill operation by allocating a PRF entry for the register and copying a value for the register from the backing store into the entry (step 504).

Branch Mispredictions

Figure 6:
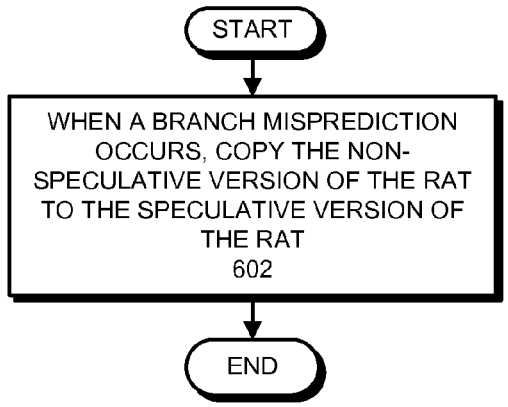
FIG. 6 presents a flow chart illustrating how the RAT is modified when a branch misprediction occurs in accordance with the disclosed embodiments.

FIG. 6 presents a flow chart illustrating how the RAT is modified when a branch misprediction occurs in accordance with the disclosed embodiments. When a branch misprediction occurs, the processor copies the non-speculative version of the RAT to the speculative version of the RAT (step 602).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A processor, comprising:
an execution pipeline configured to execute instructions for threads, wherein for each thread, an architectural state of the processor includes a set of register windows associated with nested procedure calls for the thread, wherein each register window contains registers for an associated procedure call;
a physical register file (PRF) containing both speculative and architectural versions of registers, wherein the speculative versions of the registers have been modified but have not yet been committed to the architectural state of the processor;
wherein when an instruction that writes to a destination register enters a rename stage in the execution pipeline, the rename stage is configured to allocate an entry for the destination register in the PRF;
wherein when an instruction that has written to a speculative version of a destination register enters a commit stage in the execution pipeline, the commit stage is configured to convert the speculative version into an architectural version of the destination register in the PRF, and to identify and deallocate an entry for a previous version of the destination register from the PRF; and
wherein when a register-window-restore instruction that deallocates a register window enters the commit stage, the commit stage is configured to deallocate local and output registers for the deallocated register window from the PRF.

2. The processor of claim 1, wherein when a spill-store instruction that is part of a register window spill trap handler enters the commit stage, the commit stage is configured to deallocate an entry for an associated spilled register from the PRF.

3. The processor of claim 1, further comprising:
a register alias table (RAT) that maps an architectural register to a PRF entry that holds a latest value for the register;
wherein the RAT includes an entry for each architectural register;
wherein the RAT is indexed using a thread identifier, a current window pointer and a register number; and
wherein the RAT comprises a speculative version of the RAT maintained at the rename stage and a non-speculative version of the RAT maintained at the commit stage.

4. The processor of claim 3, wherein when a branch misprediction occurs, the processor is configured to copy the non-speculative version of the RAT to the speculative version of the RAT.

5. The processor of claim 1, further comprising a written bit mask, wherein the written bit mask comprises a per-thread bit mask that includes a bit for each architectural register that indicates whether the architectural register has been written by an instruction.

6. The processor of claim 1, wherein when a register-window-save instruction that allocates a register window enters the commit stage and a number of available PRF entries is below a threshold value, the commit stage is configured to preemptively spill up to N registers starting with an oldest register window and stopping before a second youngest window, wherein spilling a register includes copying the register to a backing store and deallocating the register from the PRF.

7. The processor of claim 6, further comprising a decoupled engine configured to perform preemptive spill operations by spilling one register per cycle whenever an unused PRF read port is available.

8. The processor of claim 6, wherein when an instruction enters the rename stage and a source operand for the instruction was in a register that was preemptively spilled, the processor is configured to perform a fill operation by allocating a PRF entry for the register and copying a value for the register from the backing store into the entry.

9. The processor of claim 6, further comprising a spilled bit mask, wherein the spilled bit mask comprises a per-thread bit mask that includes a bit for each architectural register that indicates whether an associated architectural register has been preemptively spilled to the backing store.

10. The processor of claim 6,
wherein the backing store includes an entry for each architectural register;
wherein the backing store is indexed by an architectural register number; and
wherein the backing store includes one read port and one write port, or a shared read/write port.

11. A method for managing registers while executing instructions in a processor, comprising:
using an execution pipeline for the processor to execute instructions for threads, wherein for each thread, an architectural state of the processor includes a set of register windows associated with nested procedure calls for the thread, wherein each register window contains registers for an associated procedure call, and wherein the execution pipeline accesses a physical register file (PRF) containing both speculative and architectural versions of registers, wherein the speculative versions of the registers have been modified but have not yet been committed to the architectural state of the processor;

during execution of the instructions in the execution pipeline, when an instruction that writes to a destination register enters a rename stage in the execution pipeline, allocating an entry for the destination register in the PRF, when an instruction that has written to a speculative version of a destination register enters a commit stage in the execution pipeline, converting the speculative version into an architectural version of the destination register in the PRF, and identifying and deallocating an entry for a previous version of the destination register from the PRF; and when a register-window-restore instruction that deallocates a register window enters the commit stage, deallocating local and output registers for the deallocated register window from the PRF.

12. The method of claim 11, wherein when a spill-store instruction that is part of a register window spill trap handler enters the commit stage, the method further comprises deallocating an entry for an associated spilled register from the PRF.

13. The method of claim 11, wherein accessing the PRF includes accessing a register alias table (RAT) that maps an architectural register to a PRF entry that holds a latest value for the register;

wherein the RAT includes an entry for each architectural register;

wherein the RAT is indexed using a thread identifier, a current window pointer and a register number; and wherein the RAT comprises a speculative version of the RAT maintained at the rename stage and a non-speculative version of the RAT maintained at the commit stage.

14. The method of claim 13, wherein when a branch misprediction occurs, the method further comprises copying the non-speculative version of the RAT to the speculative version of the RAT.

15. The method of claim 11, wherein determining whether a register has been written includes accessing a written bit mask, wherein the written bit mask comprises a per-thread bit mask that includes a bit for each architectural register that indicates whether the architectural register has been written by an instruction.

16. The method of claim 11, wherein when a register-window-save instruction that allocates a register window enters the commit stage and a number of available PRF entries is below a threshold value, the method further comprises preemptively spilling up to N registers starting with an oldest register window and stopping before a second youngest window, wherein spilling a register includes copying the register to a backing store and deallocating the register from the PRF.

17. The method of claim 16, wherein preemptively spilling the registers includes using a decoupled engine to spill one register per cycle whenever an unused PRF read port is available.

18. The method of claim 16, wherein when an instruction enters the rename stage and a source operand for the instruction was in a register that was preemptively spilled, the method further comprises performing a fill operation by allocating a PRF entry for the register and copying a value for the register from the backing store into the entry.

19. The method of claim 16, wherein determining whether a register was spilled includes accessing a spilled bit mask, and wherein the spilled bit mask comprises a per-thread bit mask that includes a bit for each architectural register that indicates whether an associated architectural register has been preemptively spilled to the backing store.

20. A computer system, comprising:

a processor; and a memory;

wherein the processor includes, an execution pipeline configured to execute instructions for threads, wherein for each thread, an architectural state of the processor includes a set of register windows associated with nested procedure calls for the thread, wherein each register window contains registers for an associated procedure call; and a physical register file (PRF) containing both speculative and architectural versions of registers, wherein the speculative versions of the registers have been modified but have not yet been committed to the architectural state of the processor;

wherein when an instruction that writes to a destination register enters a rename stage in the execution pipeline, the rename stage is configured to allocate an entry for the destination register in the PRF;

wherein when an instruction that has written to a speculative version of a destination register enters a commit stage in the execution pipeline, the commit stage is configured to convert the speculative version into an architectural version of the destination register in the PRF, and to identify and deallocate an entry for a previous version of the destination register from the PRF; and wherein when a register-window-restore instruction that deallocates a register window enters the commit stage, the commit stage is configured to deallocate local and output registers for the deallocated register window from the PRF.

* * * * *